(12) United States Patent
Saubhasik et al.

(10) Patent No.: US 10,841,197 B1
(45) Date of Patent: Nov. 17, 2020

(54) MECHANISM TO PRESERVE WEIGHTS ASSIGNED TO NEXTHOPS

(71) Applicant: Arista Networks, Inc., Santa Clara, CA (US)

(72) Inventors: Mayukh Saubhasik, Richmond (CA); Vahab Akbarzadeh, Burnaby (CA)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 16/416,132

(22) Filed: May 17, 2019

(51) Int. Cl.
*H04L 12/751* (2013.01)

(52) U.S. Cl.
CPC .................. *H04L 45/02* (2013.01)

(58) Field of Classification Search
CPC .................. H04L 45/02; H04L 12/56
See application file for complete search history.

(56) References Cited

U.S. PATENT DOCUMENTS

| 9,712,447 B2* | 7/2017 | Wood | H04L 47/125 |
| 2018/0026880 A1* | 1/2018 | Nainar | H04L 45/02 370/389 |

* cited by examiner

*Primary Examiner* — Sharad Rampuria
(74) *Attorney, Agent, or Firm* — Chamberlain, Hrdlicka, White, Williams & Aughtry

(57) ABSTRACT

Embodiments disclosed herein relate to methods and computer-readable mediums for preserving forwarding equivalence class (FEC) hierarchy weights, which may include obtaining a FEC hierarchy; obtaining a target height for the FEC hierarchy; identifying within the FEC hierarchy a FEC node comprising pointers to a plurality of lower level FEC nodes; making a first determination that a height of the FEC node is greater than the target height; obtaining a rebasing factor for the FEC node; and updating weights for the plurality of lower level FEC nodes using the rebasing factor to obtain an updated FEC hierarchy.

18 Claims, 11 Drawing Sheets

US 10,841,197 B1

MECHANISM TO PRESERVE WEIGHTS ASSIGNED TO NEXTHOPS

BACKGROUND

Network devices receive network traffic data units (e.g., packets, frames, etc.), which may be grouped as part of a forwarding equivalence class (FEC). A FEC may be associated with one or more items of information (e.g., an egress interface out of which to send the network traffic data unit, whether a network traffic data unit should be encapsulated, etc.), which may be used, for example, when making decisions related to forwarding a network traffic data unit. Network devices, and/or hardware components therein, may have varying amounts of support for aspects of implementing the use of FECs. In order to use the amount of support a given hardware component has for implementing the use of FECs, various actions may need to be taken.

SUMMARY

In general, in one aspect, embodiments disclosed herein relate to a method for preserving forwarding equivalence class (FEC) hierarchy weights. The method may include obtaining a FEC hierarchy; obtaining a target height for the FEC hierarchy; identifying within the FEC hierarchy a FEC node comprising pointers to a plurality of lower level FEC nodes; making a first determination that a height of the FEC node is greater than the target height; obtaining a rebasing factor for the FEC node; and updating weights for the plurality of lower level FEC nodes using the rebasing factor to obtain an updated FEC hierarchy.

In general, in one aspect, embodiments disclosed herein relate to a non-transitory computer readable medium including instructions that, when executed by a processor, perform a method for preserving forwarding equivalence class (FEC) hierarchy weights. The method performed by execution of the instructions may include obtaining a FEC hierarchy; obtaining a target height for the FEC hierarchy; identifying within the FEC hierarchy a FEC node comprising pointers to a plurality of lower level FEC nodes; making a first determination that a height of the FEC node is greater than the target height; obtaining a rebasing factor for the FEC node; and updating weights for the plurality of lower level FEC nodes using the rebasing factor to obtain an updated FEC hierarchy.

Other aspects of the embodiments disclosed herein will be apparent from the following description and the appended claims.

DETAILED DESCRIPTION

Figure 1:
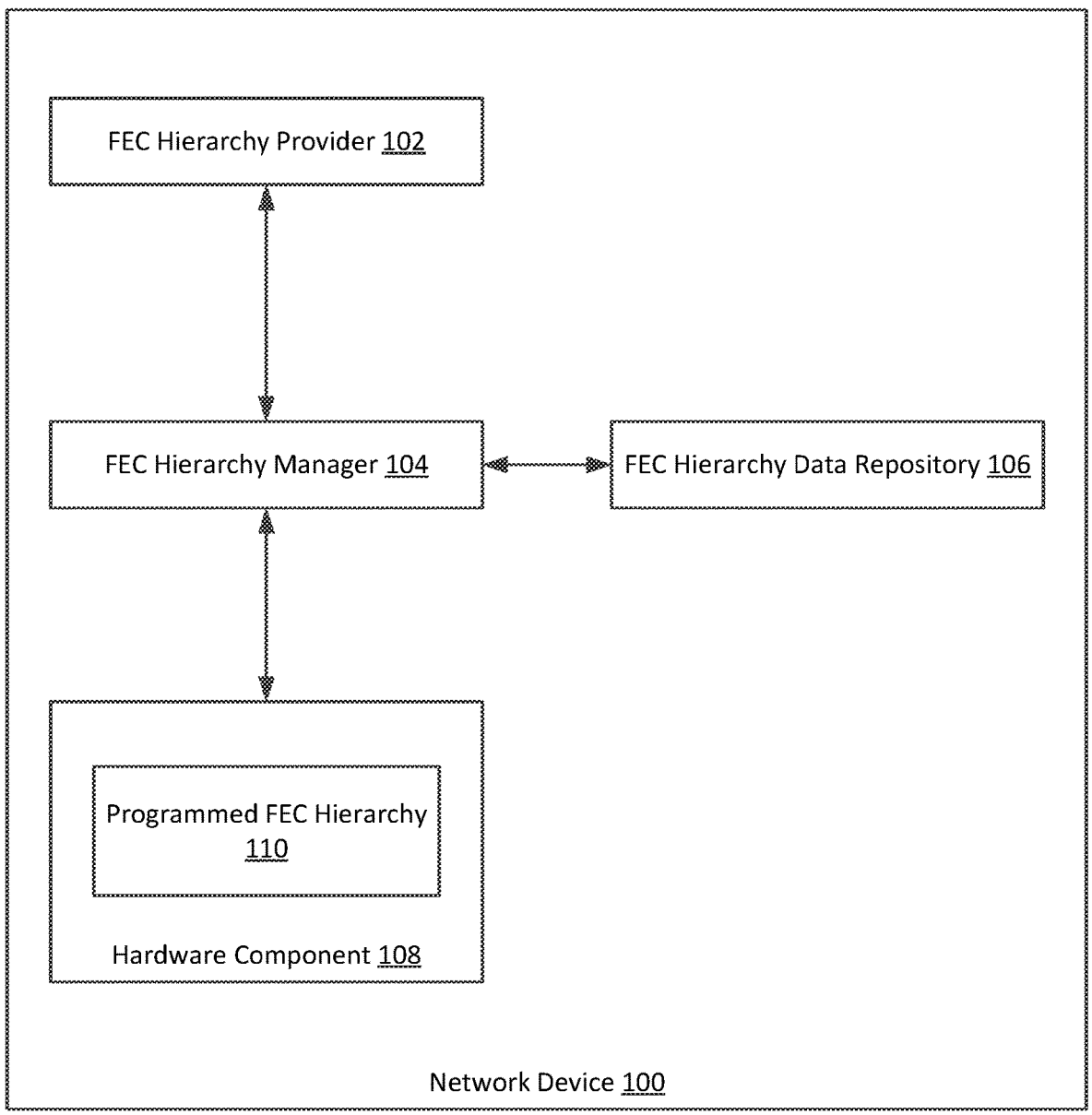
FIG. 1 shows a system in accordance with one or more embodiments described herein.

Specific embodiments will now be described with reference to the accompanying figures. In the following description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods and systems for preserving or substantially preserving FEC hierarchy weights when programming and/or flattening and programming a FEC hierarchy to a hardware component. Specifically, in one or more embodiments, an obtained FEC hierarchy that has unequal weights assigned to links between FECs in different levels of the FEC hierarchy is assessed to determine whether its hierarchy height is greater than a target height that represents a maximum levels of indirection (MLI) quantity supported for a hardware component to which the FEC hierarchy is to be programmed.

In one or more embodiments, if the hierarchy height is equal to or less than the target height, then the FEC hierarchy may be programmed without any FEC hierarchy flattening. However, in one or more embodiments, for a FEC hierarchy that uses unequal cost multipath (UCMP), prior to programming the unflattened FEC hierarchy, the nodes of the FEC hierarchy may be examined to determine if the unequal set of path costs (i.e., weights) coming out of a given FEC node of the FEC hierarchy have a greatest common divisor (GCD). If so, each such set of costs may be divided by the GCD for that set. In one or more embodiments, dividing a set of unequal weights by the GCD of the set reduces the number of entries that are programmed to hardware, thereby reducing the amount of hardware required to program the FEC hierarchy, while still maintaining the relative weights of the FEC hierarchy.

In one or more embodiments, if the hierarchy height is greater than the target height, then a FEC hierarchy flattening action set is performed in order to reduce the hierarchy height to a height that is supported by the hardware component to which the FEC hierarchy is to be programmed (i.e., a height equal to or less than the target height). In one or more embodiments, as part of the FEC hierarchy flattening action set, steps are taken to preserve or substantially preserve the relative weights of the FEC hierarchy. In one or more embodiments, taking such steps results in a flattened FEC hierarchy for which the proportional distribution of network traffic is the same or similar to the distribution of network traffic in the FEC hierarchy prior to the flattening.

In one or more embodiments, steps taken to preserve or substantially preserve the relative weights of the FEC hierarchy may include, but are not limited to, identifying a FEC entry (which may also be referred to as a FEC node) of a FEC hierarchy having identifiers for a set of lower-level FEC entries at a level immediately below the FEC of the FEC entry; determining that the FEC entry height is greater than a target height; determining a rebasing factor for the FEC entry; removing one or more FEC nodes below the FEC of the FEC entry in order to reduce the height of the FEC entry; updating the weights of the links to lower level nodes using the rebasing factor; dividing the set of weights of the lower level FECs using a GCD, and/or reducing the total of the weights of the FEC hierarchy to be less than a maximum weight supported by a hardware component.

FIG. 1 shows a network device in accordance with one or more embodiments described herein. As shown in FIG. 1, the network device (100) includes a FEC hierarchy provider (102), a FEC hierarchy manager (104), a FEC hierarchy data repository (106), and at least one hardware component (108). A hardware component (108) may include a programmed FEC hierarchy (110). Each of these components is described below.

In one or more embodiments, a network device (100) is a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (100) include, but are not limited to, a network switch, a router, a multilayer switch, a fibre channel device, an InfiniBand® device, etc. A network device (100) is not limited to the aforementioned specific examples.

In one or more embodiments, a network device (100) includes functionality to receive network traffic data units (e.g., frames, packets, tunneling protocol frames, etc.) at any of the physical network interfaces (i.e., ports) of the network device (100) and to process the network traffic data units. In one or more embodiments, processing a network traffic data unit includes, but is not limited to, a series of one or more table lookups (e.g., longest prefix match (LPM) lookups, FEC lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device (100). One or more actions to be taken with regards to a received network traffic data unit may be obtained by a network device based on the network traffic data unit being recognized as falling within a FEC, which may have one or more associated actions and/or items of information relevant to processing the network traffic data unit (e.g., label switched path protocol actions, multipath information, egress interface information, etc.).

In one or more embodiments, a network device also includes and/or is operatively connected to device storage and/or device memory (i.e., non-transitory computer readable mediums) storing software and/or firmware.

Such software and/or firmware may include instructions which, when executed by the one or more processors (not shown) of a network device (100), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (100) is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (100)) that facilitate network connectivity for one or more operatively connected devices (e.g., computing devices, data storage devices, other network devices, etc.). In one or more embodiments, the network device (100) and other devices within the network (not shown) are arranged in a network topology (not shown). In one or more embodiments, a network topology is an arrangement of various devices of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

In one or more embodiments, a network device (100) includes and/or is operatively connected to a FEC hierarchy provider (102). In one or more embodiments, a FEC hierarchy provider (102) is hardware (e.g., circuitry) and/or a combination of hardware and software that includes functionality including, but not limited to, providing a FEC hierarchy. In one or more embodiments, a FEC hierarchy includes a set of FEC entries, which may be referred to as FEC nodes. A FEC entry may include information relating to actions to be performed upon receipt of a network traffic data unit having one or more characteristics (e.g., destination address, source address, etc.) that identify the network traffic data unit as being within a FEC. Such information/actions may include, but are not limited to: identification of an egress interface out of which the network traffic data unit is to be forwarded to a next-hop device; adding a Multiprotocol Label Switching (MPLS) label; rewriting source or destination media access control (MAC) header information; encapsulating the network traffic data unit in accordance with a tunneling protocol (e.g., Virtual eXtensible Local Area Network (VXLAN)) header; etc.

Additionally, a FEC entry in a FEC hierarchy may include a pointer to another FEC and/or to an egress port. As used herein, the term 'pointer' may refer to any type of information in a FEC entry identifying another FEC, which may be a lower-level FEC, or an egress port, thereby signifying that a link exists in the hierarchy between the FEC of the FEC entry and the other FEC or egress port identified therein. In one or more embodiments, any higher level FEC node may point to any number of lower level FEC nodes and/or any number of egress ports, with each lower level entity (i.e., FEC node or egress port) having an assigned weight (weight is discussed further below).

In one or more embodiments, a FEC entry that includes identifying information for a given FEC and a pointer to another FEC adds a level of indirection to a FEC hierarchy. A chain of such entries, in which one FEC points to another FEC, which points to another FEC, etc., may have a number of levels of indirection. For a given FEC hierarchy, the one or more FEC entries with the largest number of levels of indirection may define a hierarchy height of the FEC hierarchy. A FEC hierarchy may include any number of levels of indirection, and, thus, may have any hierarchy height.

In one or more embodiments, a FEC hierarchy provider (102) may be platform agnostic, meaning that the FEC hierarchy provider (102) may not need to take into account the capabilities of the underlying hardware into which a FEC hierarchy is to be programmed. Accordingly, in one or more embodiments, a FEC hierarchy provider (102) may provide any FEC hierarchy that is deemed the most desirable based on any parameters available to the FEC hierarchy provider. In one or more embodiments, not having to account for hardware capabilities may reduce the required complexity of executing a FEC hierarchy provider (102).

In one or more embodiments, a given FEC entry may include a pointer to another FEC as well as additional information and/or actions. In one or more embodiments, any number of higher-level FEC entries in a FEC hierarchy may include pointers to the same lower-level FEC. For example, a bottom-level FEC entry in a FEC hierarchy, which may also be referred to as a leaf FEC entry, may include an egress interface associated with the bottom-level FEC, and twenty-seven FEC entries in the next higher level of the FEC hierarchy may include a pointer to the bottom-level FEC. Such a FEC hierarchy may, for example, allow for more expedient convergence of a FEC table because if the egress of interface for the bottom-level FEC changes, only the one entry for the bottom-level FEC needs to be updated. The twenty-seven higher-level FEC entries may remain the same, as they still point to the bottom-level FEC. In one or more embodiments, a FEC hierarchy may also reduce hardware storage requirements when using FECs, as a smaller set of information may be stored to facilitate the actions relating to FECs.

In one or more embodiments, a FEC hierarchy provider (102) may be any type of entity that seeks to utilize a FEC hierarchy to perform certain functionality. For example, a FEC hierarchy provider (102) may be a software agent executing using hardware resources of a network device (100) to implement, at least in part, the Boarder Gateway Protocol (BGP) for the network device, and, as such, may generate a FEC hierarchy to implement BGP related routing functionality on the network device (100). Other examples of protocols or network implementation schemes that may use a FEC hierarchy include, but are not limited to, MPLS, UCMP, equal cost multi-path (ECMP), Open Shortest Path First (OSPF), etc.

In one or more embodiments, a FEC hierarchy may implement a UCMP scheme. In such a FEC hierarchy, each pointer from a FEC node to a lower level FEC node may be assigned a weight. In one or more embodiments, some or all of the pointers from a given FEC node have different weights (i.e., the 'unequal' in unequal cost multipath (UCMP)). In one or more embodiments, a weight is a natural number. In one or more embodiments, the weight assigned to a given pointer (i.e., to a lower level FEC node that has an identifier/pointer in a higher level FEC node) indicates the relative proportion of network traffic data units that fall within the FEC of a FEC node that should be processed according to the lower level FEC node. For example, a given FEC node may include an identifier for three lower level FEC nodes. The first lower level FEC node may have a weight of five, the second lower level FEC node may have a weight of three, and the third lower level FEC node may have a weight of two. In such a FEC hierarchy, the weights of the lower level FEC nodes indicate that the first lower level FEC node should be used to process fifty percent of the network traffic falling within the higher level FEC node, the second lower level FEC node should be used to process thirty percent of the network traffic falling within the higher level FEC node, and the third lower level FEC node should be used to process twenty percent of the network traffic falling within the higher level FEC node.

In one or more embodiments, to implement UCMP in the context of a FEC hierarchy, weights are included in and/or are in any way associated with hardware programming entries. Such weights may be represented as any type of information in any format stored anywhere in a network device. In one possible example of implementing UCMP in the context of a FEC hierarchy, hardware programming entries are created in quantities corresponding to the weights assigned to lower level FEC nodes so that the number of programmed entries exist in the relative proportions indicated by the weights once programmed to a hardware component. Continuing the previous example, there would be five hardware programming entries created that include the FEC of the higher level FEC node and an identifier of the first lower level FEC node, three hardware programming entries created that include the FEC of the higher level FEC node and an identifier of the second lower level FEC node, and two hardware programming entries created that include the FEC of the higher level FEC node and an identifier of the third lower level FEC node. In one or more embodiments, programming quantities of entries corresponding to the assigned weights of FEC nodes allows the desired proportions of network traffic to be processed according to the lower level FEC nodes when load balancing among the entries that are programmed to a hardware component. Hardware components and programming entries of a FEC hierarchy to a hardware component is discussed further below.

In one or more embodiments, a network device (100) includes and/or is operatively connected to a FEC hierarchy manager (104). In one or more embodiments, a FEC hierarchy manager (104) is hardware (e.g., circuitry) and/or a combination of hardware and software that includes functionality including, but not limited to, determining whether a FEC hierarchy obtained from a FEC hierarchy provider (102) should be flattened, in whole or in part, based on capabilities of a hardware component (108) into which a FEC hierarchy is to be programmed, and, whether flattening a FEC hierarchy or not, preserving weights of a FEC hierarchy when programming a FEC hierarchy to a hardware component.

In one or more embodiments, flattening a FEC hierarchy is reducing, if necessary, the number of levels of indirection present in the FEC hierarchy, thereby reducing the hierarchy height. Such flattening may occur so that the hierarchy height is equal to or less than what a network device and/or hardware component therein is capable of supporting which, as discussed above, may be referred to as an MLI quantity of a network device or hardware component therein. In one or more embodiments, an MLI quantity represents a target height that a FEC hierarchy to be programmed to a hardware component must be equal to or less than before the FEC hierarchy may be programmed. FEC hierarchy flattening is discussed further in the description of FIG. 2, below.

In one or more embodiments, if UCMP is implemented within a FEC hierarchy, then the relative weights assigned to the various lower level FEC nodes should be preserved during the flattening of a FEC hierarchy such that the same or substantially the same percentage of network traffic should be processed according to lower level FEC nodes as would be if the FEC hierarchy were not flattened.

In one or more embodiments, a FEC hierarchy manager (104) is operatively connected to a FEC hierarchy provider (102). For example, a data path may exist between a FEC hierarchy provider (102) and a FEC hierarchy manager (104) that uses shared memory (not shown) as the mechanism by which the FEC hierarchy manager (104) obtains a FEC hierarchy from a FEC hierarchy provider (102). In one or more embodiments, a FEC hierarchy manager includes software executing on hardware of the network device, and logically exists within a hardware abstraction layer such that it provides the capability of programming (or causing the programming of) FEC hierarchies from FEC hierarchy providers to one or more hardware components (e.g., hardware component (108)).

In one or more embodiments, a FEC hierarchy manager (104) is operatively connected to a FEC hierarchy data repository (106). In one or more embodiments, a data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments, a FEC hierarchy data repository (106) includes functionality to store data that may be used by a FEC hierarchy manager (104) when performing FEC flattening and/or programming actions.

For example, if a FEC hierarchy has previously been flattened to meet the capabilities of a first hardware component of a network device (100), then the hierarchy height of the flattened FEC hierarchy may be stored. In such an example, if another hardware component requires the FEC hierarchy to be programmed, the FEC hierarchy manager may first check the stored hierarchy height information. In one or more embodiments, if the hierarchy height falls within the number of levels of indirection supported by the new hardware component, the FEC hierarchy manager (104) may re-use the flattened FEC hierarchy rather than re-perform the flattening actions, thereby saving time and computational load on the hardware of the network device. Other examples of information that may be stored in a FEC hierarchy data repository include, but are not limited to, one or more target heights corresponding to one or more hardware components, and one or more target maximum weight values corresponding to one or more hardware components. In one or more embodiments, a maximum weight of a hardware component represents the maximum number of entries representing nodes of a FEC hierarchy that may be programmed to the hardware component.

In one or more embodiments, the FEC hierarchy manager is also operatively connected to at least one hardware component (108). In one or more embodiments, a hardware component (108) is any hardware (e.g., circuitry such as, for example, application specific integrated circuits (ASICs)), which may include and/or be programmed by/with software and/or firmware, that includes functionality related to receiving, processing, and/or transmitting network traffic data units in accordance with one or more embodiments described herein. In one or more embodiments, a hardware component (108) is a packet processor (e.g., a network chip), a field programmable gate array (FPGA), and/or any other component into which a flattened or unflattened FEC hierarchy may be programmed.

In one or more embodiments, the network device (100) includes any number of hardware components (108) (e.g., network chips, field programmable gate arrays (FPGAs), etc.).

In order to perform such functionality, a hardware component may include any number of subcomponents (not shown). Such subcomponents may include, but are not limited to, one or more processors, one or more buffers (e.g., for implementing receive and/or transmit queues, such as virtual output queues (VOQs)), any type or amount of storage of or storing hardware tables (e.g., FEC tables). Such tables may control, at least in part, various aspects of the operation of a network device (100), such as functionality related to network traffic data unit forwarding, maximum transmission unit enforcement, encapsulation/decapsulation, address rewrites, etc. Examples of storage for hardware table may include, but are not limited to, tertiary content addressable memory (TCAM) and static random access memory (SRAM). A hardware component (108) may also include and/or be operatively connected to any number of physical network interfaces of a network device (100). Such interfaces may provide a path external to the network device (e.g., to other devices), and/or may be operatively connected to other components internal to the network device (100), and each such interface may be an ingress and/or egress interface.

As a non-limiting example, a hardware component may be and/or may include an ASIC that receives network traffic data units at an ingress port and, so long as no policy associated with a FEC that a given network traffic data unit is in indicates that the network traffic data units should be dropped, determines out of which egress port on the network device (100) to forward the network traffic data units.

In one or more embodiments, a hardware component (108) includes functionality to support any zero or more MLI quantity. In one or more embodiments, if a given hardware component only supports an MLI quantity of zero, then a FEC hierarchy from a FEC hierarchy provider must be completely flattened (i.e., all levels of indirection removed) before being programmed to the hardware component (108). In one or more embodiments, for a hardware component that supports an MLI quantity of one or more, then a FEC hierarchy from a FEC hierarchy provider must be flattened enough so that the hierarchy height of the flattened FEC hierarchy is equal to or less than the MLI quantity. In one or more embodiments, as discussed above, a hardware component (108) also has a maximum weight value.

In one or more embodiments, a hardware component (108) may store a programmed FEC hierarchy (110). In one or more embodiments, a programmed FEC hierarchy (110) is a FEC hierarchy that has been programmed, directly or indirectly, by a FEC hierarchy manager (104). In one or more embodiments, a programmed FEC hierarchy (110) may or may not be flattened, and has the weights of the hierarchy preserved in either case.

While FIG. 1 shows a configuration of components, other configurations may be used without departing from the scope embodiments of described herein. For example, there may be any number of FEC hierarchy providers. As another example, there may be any number of FEC hierarchy managers. As another example, there may be any number of hardware components, software instances, etc. that are not shown in FIG. 1. Accordingly, embodiments disclosed herein should not be limited to the configuration of components shown in FIG. 1.

Figure 2:
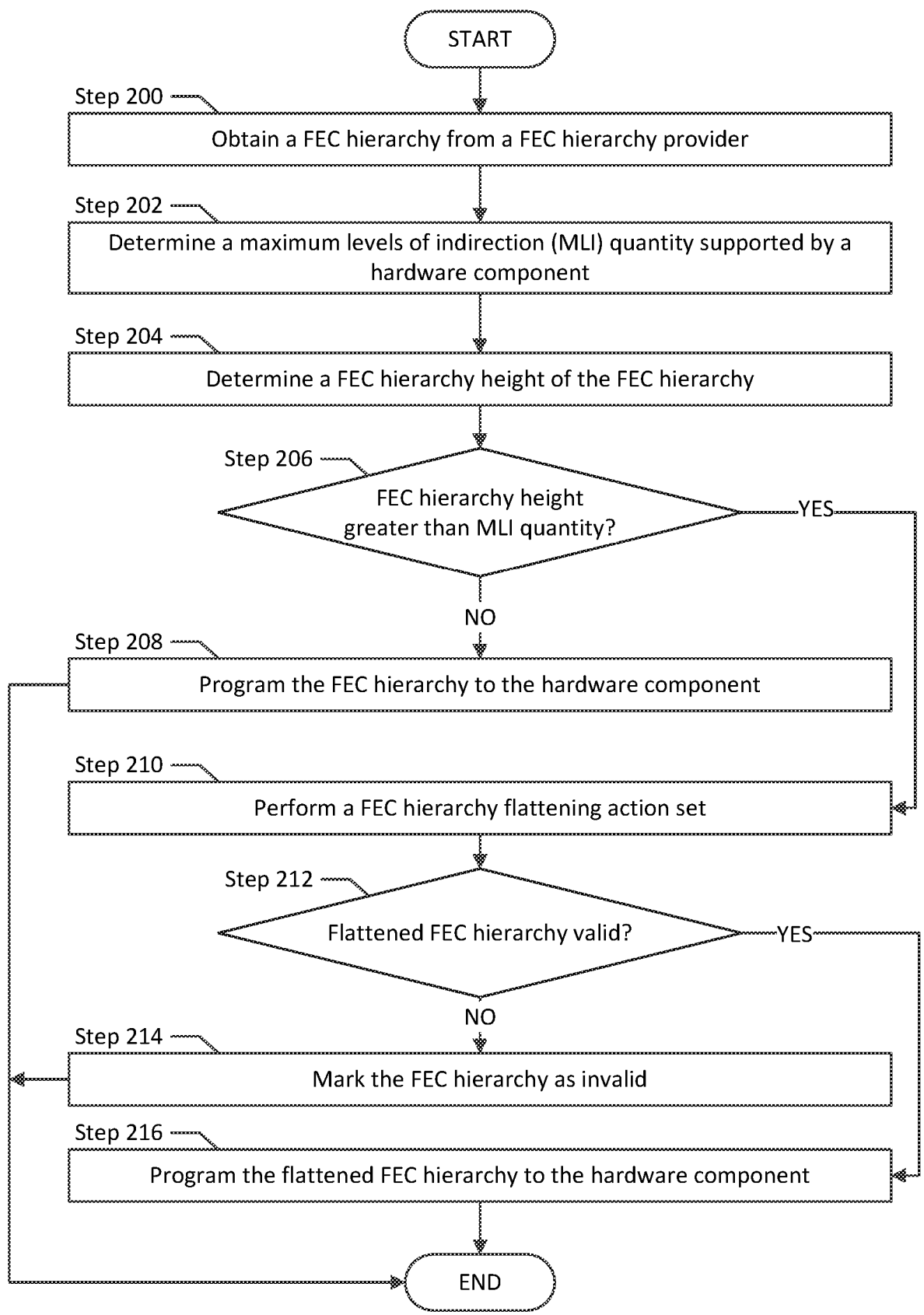
FIG. 2 shows a flowchart in accordance with one or more embodiments described herein.

FIG. 2 shows a flowchart describing a method for programming a FEC hierarchy in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a FEC hierarchy is obtained from a FEC hierarchy provider. In one or more embodiments, the FEC hierarchy is obtained by a FEC hierarchy manager. For example, the FEC hierarchy may be obtained by the FEC hierarchy manager from the FEC provider using inter-process communication. In one or more embodiments, the obtained FEC hierarchy has any number of levels of indirection and, thus, any hierarchy height. In one or more embodiments, the hierarchy height of the FEC hierarchy is determined by the FEC hierarchy provider prior to making the FEC hierarchy available to the FEC hierarchy manager. In one or more embodiments, the FEC hierarchy implements UCMP and, therefore, at least some of the links (i.e., pointers) between FEC nodes of the FEC hierarchy have assigned weights in order to cause the desired distribution of network traffic for network traffic data units that fall within the FEC of a given FEC node.

In Step 202, an MLI quantity (i.e., target height) is determined for one or more hardware components of a network device. Although Step 202 is shown after Step 200, in one or more embodiments, the MLI quantity determination may be made prior to obtaining a FEC hierarchy. In one or more embodiments, a network device as a whole may have an MLI quantity. In such embodiments, the MLI quantity may correspond to a hardware component having the lowest MLI quantity. In other embodiments, one or more individual hardware components of a network device may have different MLI quantities. In still other embodiments, some hardware components of a network device may have the same MLI quantity while other hardware components have different MLI quantities. In one or more embodiments, the MLI quantity is determined using any method of assessing the hardware support available for one or more hardware components. For example, when a network device is powered on, MLI quantities for one or more hardware components may be ascertained and stored in a storage device accessible by a FEC hierarchy manager (e.g., a FEC hierarchy data repository).

In Step 204, a hierarchy height of the FEC hierarchy obtained in Step 200 is determined. In one or more embodiments, a hierarchy height is determined by starting at the bottom of the FEC hierarchy (i.e., the level that indicates actions to be performed and/or egress ports from which to forward, but does not point to another FEC), which may be referred to as a leaf FEC node or a bottom level FEC node. In one or more embodiments, the FEC hierarchy is then traversed up the hierarchy to determine the most levels of indirection present in the FEC hierarchy, which may be considered the hierarchy height of the FEC hierarchy. For example, a given FEC hierarchy may have a FEC node that points to another FEC node that points to another FEC node entry that points to another FEC node that points to an egress interface. Such a FEC hierarchy would have a hierarchy height of three, because the three aforementioned levels of indirection represent the most levels of indirection present in the FEC hierarchy.

In Step 206, a determination is made whether the hierarchy height determined in Step 204 is greater than the target height for any hardware component to which the FEC hierarchy is to be programmed. Such a determination may be considered a comparison and, as such, may yield a comparison result. In one or more embodiments, if the hierarchy height is less than or equal to the target for a given hardware component, the method proceeds to Step 208. If, on the other hand, the hierarchy height is determined to be greater than the MLI quantity for a given hardware component, the method proceeds to Step 210.

In Step 208, the FEC hierarchy is programmed to one or more hardware components of a network device. In one or more embodiments, programming a FEC hierarchy may include storing the FEC hierarchy in storage of the one or more hardware components. For example, the FEC hierarchy may be represented as a table, with entries that include a FEC associated with an identifier of one or more other FECs, and/or any number of other actions or items of information. Such a table may, for example, be stored in a hardware table of a hardware component. In one or more embodiments, programming an unflattened FEC hierarchy may be considered part of a FEC hierarchy action set. In one or more embodiments, once the unflattened FEC hierarchy is programmed to a hardware component, the process ends. In one or more embodiments, prior to programming a FEC hierarchy implementing a UCMP scheme, the set of weights from a given FEC node may be assessed to determine if the set has a GCD. In one or more embodiments, if a given set of weights has a GCD, then each of the weights in the set are divided by the GCD. Dividing FEC hierarchy weights by a GCD is discussed further in the description of FIG. 3, below.

In Step 210, based on the determination in Step 206 that the hierarchy height is greater than the target height of a given hardware component, a FEC hierarchy flattening action set is performed. In one or more embodiments, a FEC hierarchy flattening action set may be considered part of a FEC hierarchy action set. In one or more embodiments, performing a FEC hierarchy flattening action set includes examining the FEC hierarchy obtained in Step 200. In one or more embodiments, each FEC node of the FEC hierarchy that has a number of levels of indirection from the bottom layer of the FEC hierarchy that is greater than the MLI quantity of the hardware component is identified. In one or more embodiments, for each such identified FEC node, one or more actions are performed in order to reduce the number of levels of indirection for that FEC node. In one or more embodiments, a FEC flattening action set continues to be performed until the hierarchy height of the flattened FEC hierarchy is reduced to be equal to or less than the target height of the hardware component to which the flattened FEC hierarchy is to be programmed.

In one or more embodiments, actions that may be a part of a FEC hierarchy flattening action set include, but are not limited to: extracting actions and/or information from lower level FEC nodes to be included in hardware programming entries for higher level FEC nodes; determining whether the extracted actions and/or information extracted from lower level FEC nodes require adjustment of the hardware programming entry for a higher level FEC node (e.g., two FEC nodes include an action to push an MPLS label onto a network traffic data unit which must be adjusted to a single combined push action); and determining whether any FEC nodes are not directly referenced by any route and are absorbed hardware programming entries for higher level FEC nodes, which would render programming such a FEC node to hardware unnecessary. In one or more embodiments, performing a FEC hierarchy flattening action set for a FEC hierarchy implementing UCMP also includes performing one or more actions to preserve the relative weights of lower level FEC nodes of the FEC hierarchy prior to performing the FEC hierarchy flattening action set. Actions for preserving the relative weights of lower level FEC nodes of the FEC hierarchy prior to performing the FEC hierarchy flattening action set is discussed further in the description of FIG. 3, below.

In Step 212, a determination is made as to whether the flattened FEC hierarchy is a valid FEC hierarchy. In one or more embodiments, an invalid FEC hierarchy is a FEC hierarchy that results in a flattened FEC entry that includes conflicting actions. Said another way, some combinations of actions may not be supported, which may be detected, and causes the yielded flattened FEC to be rendered invalid, and must not be programmed. In one or more embodiments, if a flattened FEC hierarchy is invalid, the method proceeds to Step 214. If, on the other hand, a flattened FEC hierarchy is determined to be valid, in one or more embodiments, the method proceeds to Step 216.

In Step 214, based on the determination made in Step 212, the flattened FEC hierarchy is marked as invalid. In one or more embodiments, a flattened FEC hierarchy that is marked as invalid is not programmed to a hardware component. In one or more embodiments, once a flattened FEC hierarchy is marked as invalid, although not shown in FIG. 2, one or more actions are taken to alert other entities that the flattening did not result in a valid flattened FEC hierarchy. Such entities may include, but are not limited to, the FEC hierarchy provider from which the FEC was obtained in Step 200, another FEC hierarchy related agent executing on the network device, a network administrator, etc. In one or more embodiments, once such actions are taken, the process ends.

In Step 216, the valid flattened FEC hierarchy is programmed to one or more hardware components of one or more network devices. In one or more embodiments, performing the FEC hierarchy flattening action set results in a number of hardware programming entries. In one or more embodiments, the hardware programming entries are for leaf FEC nodes, for FEC nodes that had a number of levels of indirection less than or equal to the MLI quantity of a hardware component, and/or flattened FEC nodes that had a number of levels of indirection greater than the MLI quantity. In one or more embodiments, each of the hardware programming entries is programmed to the hardware component directly by a FEC hierarchy manager. In other embodiments, the FEC hierarchy manager may operate in conjunction with a programming interface for a hardware component to program the hardware programming entries of the flattened FEC hierarchy. In one or more embodiments, the hierarchy height of the flattened FEC hierarchy is then stored in a storage location of the network device to expedite future flattening action sets.

Figure 3:
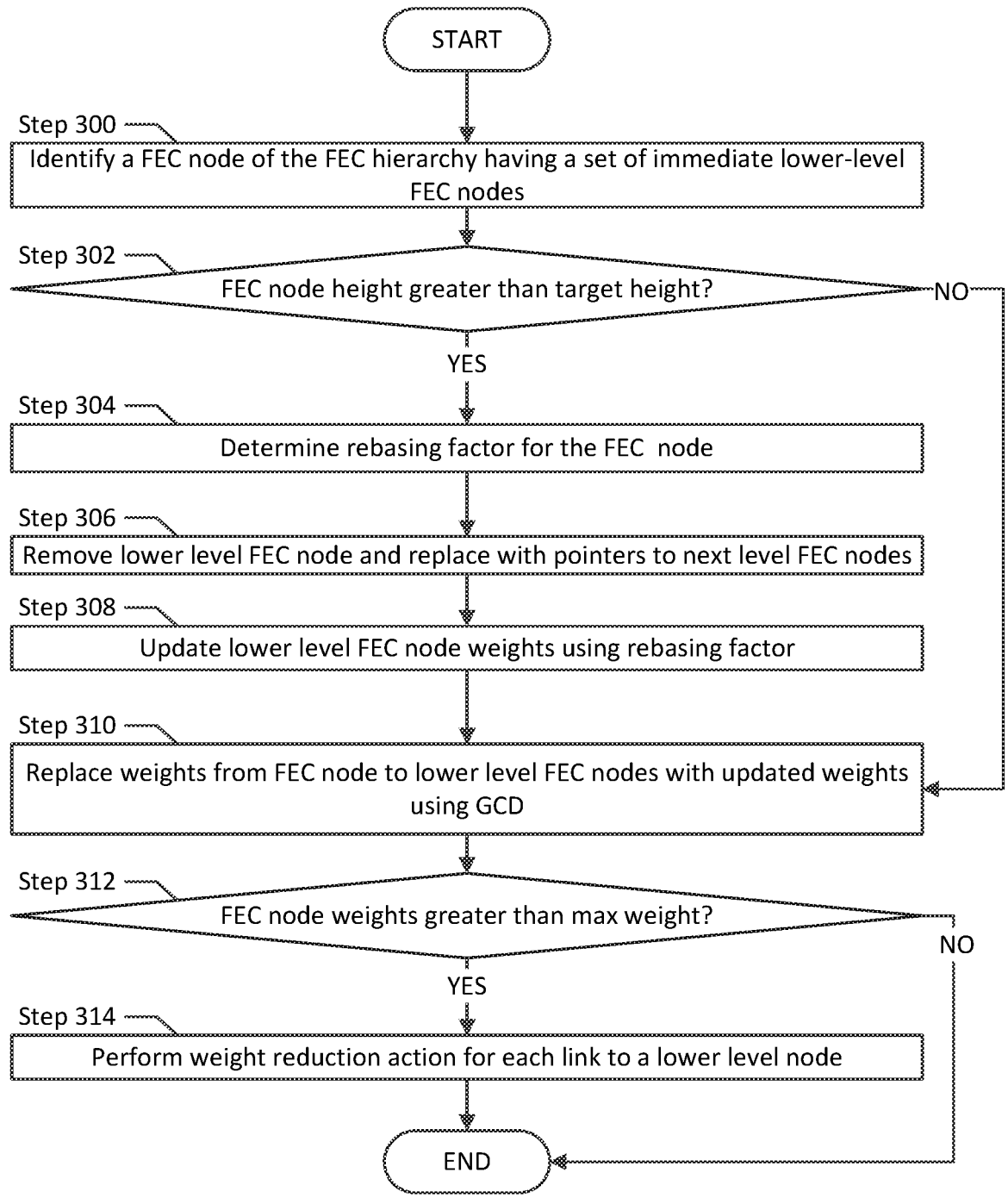
FIG. 3 shows a flowchart in accordance with one or more embodiments described herein.
Figure 4:
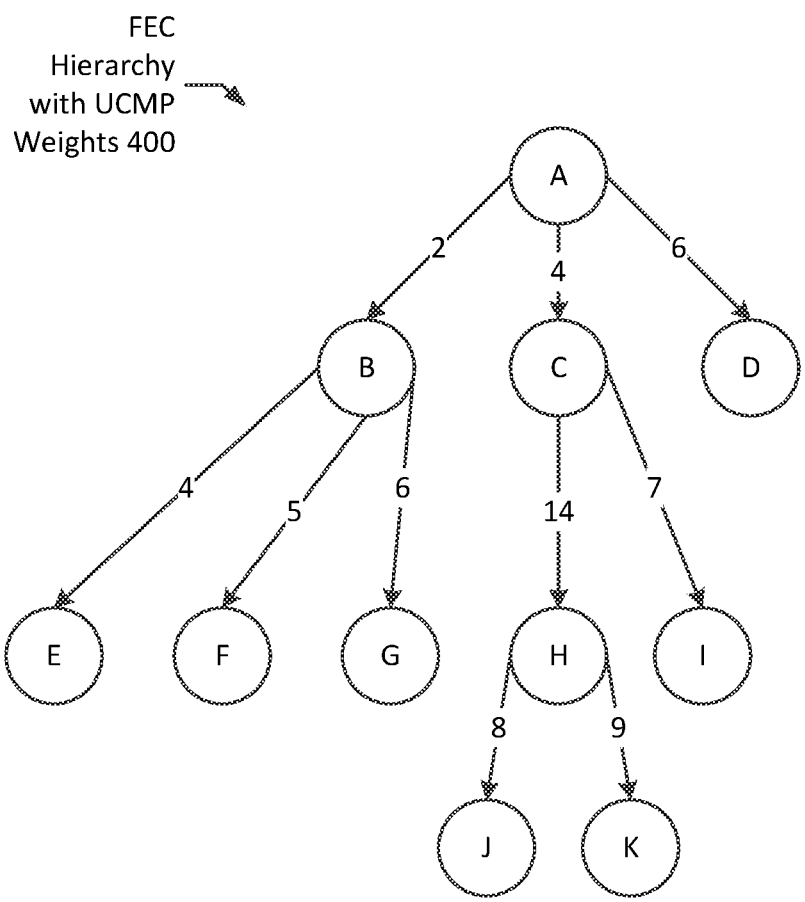
FIGS. 4-8 show an example in accordance with one or more embodiments described herein.

FIG. 3 shows a flowchart describing a method for preserving or substantially preserving relative weights of an obtained FEC hierarchy while performing a FEC hierarchy action set and/or performing a FEC hierarchy flattening action set in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 300, after a FEC hierarchy has been obtained (as in Step 200 of FIG. 2), and during the performance of a FEC hierarchy action set, a FEC node of the FEC hierarchy having a set of intermediate lower level FEC nodes is identified. In one or more embodiments, a FEC hierarchy implementing UCMP will have higher level FEC nodes that have pointers to a set of lower level FEC nodes, with the lower level FEC nodes each having an assigned weight, which may be different from one another and, in order to preserve the relative weights, such a FEC node must be identified. Although FIG. 3 shows a single such FEC node being identified, one of ordinary skill in the art, having the benefit of this Detailed Description, will appreciate that preserving relative FEC weights for a FEC hierarchy implementing UCMP will identify all such FEC nodes in the FEC hierarchy, and perform the remaining steps of FIG. 3 for each such node.

In Step 302, a determination is made as to whether the FEC node has a height greater than the target height for the hardware component to which the FEC hierarchy is to be programmed. In one or more embodiments, the height for a given FEC node is greater than the target height if the number of levels of indirection between a given FEC node and a bottom level FEC node exceeds the target height. In one or more embodiments, for the height of a FEC node to be greater than the target height, the FEC node height is necessarily at least one or more, meaning that at least one level of indirection exists below the FEC node. In one or more embodiments, if the FEC node height is not greater (i.e., equal to or less than) than the target height, the method proceeds to Step 310. In one or more embodiments, if the FEC node height is greater than the target height, the method proceeds to Step 304.

In Step 304, a rebasing factor is determined for the FEC node identified in Step 300. In one or more embodiments, determining the rebasing factor includes finding rebasing weights of all the immediate next level FECs to which the FEC node includes a FEC identifier (i.e., a pointer), and then finding a lowest common multiple (LCM) of those weights. In one or more embodiments, if a given immediate lower level FEC node has an additional level of indirection to a set of next level FEC nodes, or pointers to one or more egress ports, then the rebasing weight used in determining the rebasing factor is the sum of the weights to each next level FEC node or egress port. In one or more embodiments, if the immediate lower level FEC node has no layers of indirection below it in the FEC hierarchy, then the rebasing weight for that lower level FEC node is one.

As an example, if a given higher level FEC node may include a pointer to two lower level FEC nodes, FEC node A and FEC node B. FEC node A may not include a pointer to any next level FEC node, while the FEC node B includes a pointer to two next level FEC nodes, one having a weight of five and the other having a weight of three. In such a scenario, the rebasing weight for FEC node A will be one, and the rebasing weight of FEC node B will be 8 (i.e., the sum of five and three). In such an example, the LCM, and therefore the rebasing factor, for the FEC node is 8.

In Step 306, one or more immediate lower level FEC nodes that have an additional level of indirection to a set of next level FEC nodes (thereby contributing to the height of a higher level FEC node), or to pointers to one or more egress ports is removed. In one or more embodiments, removing such lower level FEC nodes reduces the height of the higher level FEC node by one, thereby reducing the hierarchy height of the FEC hierarchy.

In Step 308, in one or more embodiments, for each removed lower level FEC node, the pointer to the removed lower level FEC node is replaced by a pointer to each of the next level FEC nodes or egress ports that were pointed to by the removed lower level FEC node, and each pointer is assigned a new weight using the rebasing factor.

In one or more embodiments, for a given next level FEC node or egress port, the new weight assigned to the pointer is calculated by multiplying the original weight from the higher level FEC node to the removed lower level FEC node, the original weight from the removed lower level FEC node to the next level FEC node or egress port, and the rebasing factor obtained in Step 304 divided by the sum of the outgoing weights of the removed lower level FEC node.

As an non-limiting example, consider a scenario in which, in a FEC hierarchy, FEC node A points to two lower level nodes, FEC node B and FEC node C. The weight for FEC node C is 1 and the weight for FEC node B is 2. FEC node B points to FEC node D with a weight of 20, FEC node E with a weight of 10, and FEC node F with a weight of 10. The FEC hierarchy has a height of 2 (i.e., A→B→[D, E, and F]), and the target height is 1. Accordingly, FEC node B is to be removed.

In such a scenario, the rebasing factor is the LCM of 1 and 40 (i.e., 20+10+10, which are the weights from the to-be-removed FEC node B). The LCM of 1 and 40 is 40. To find the weights from FEC node A to FEC node D after the removal of FEC node B, the rebasing factor is divided by the sum of the outgoing weights from FEC node B, which is 40. 40 divided by 40 is 1. The result 1 is then multiplied by the weight from FEC node A to FEC node B (i.e., 2) and the weight from FEC node B to FEC node D (i.e., 20), resulting in a weight from FEC node A to FEC node D of 40. Similar calculations are performed for FEC nodes E and F, each resulting in a weight from FEC A of 20.

In one or more embodiments, if a given lower level FEC node had no next level FEC nodes, to obtain the updated weight, the weight from the higher level FEC node to the lower level FEC node is multiplied by the rebasing factor. Continuing the previous example, because FEC node C had no next level FEC nodes, the weight from FEC node A to FEC node C (i.e., 1) is multiplied by the rebasing factor 40, yielding a weight of 40. Now the weight from FEC node A to FEC node C represents one-third of the total weights outgoing from FEC node A, and the sum of the weights from FEC node A to FEC nodes D, E, and F represents two-thirds of the total weights outgoing from FEC node A. Therefore, the original ratios of network traffic out of FEC node A have been preserved, as the total of the original weights from FEC A (i.e., 1 and 2) was 3, and FEC node C was one third of the weight, and now-removed FEC node B was two-thirds of the weight.

In Step 310, if the set of weights from a given FEC node have a GCD, then the weights are divided by the GCD. Such division may be performed if the FEC node height was not higher than the target height, as determined in Step 302. Such division may also be performed if the FEC node height was greater than the target height, and the height was reduced, as discussed in the description of Steps 304-308. For example, if a set of weights from a given FEC node to three lower level FEC nodes or egress ports are four, eight, and sixteen, the GCD is four, and the resulting weights are one, two, and four. Although FIG. 3 shows Step 310 occurring after Step 302, one having ordinary skill in the art, and the benefit of this Detailed Description will appreciate that dividing FEC weights by a GCD may occur prior to Step 302, as a mechanism for reducing the required number of FEC entries to program a FEC hierarchy regardless of whether the height of a given FEC node is greater than the target height.

In Step 312, a determination is made as to whether the sum of the FEC weights of the flattened or unflattened FEC hierarchy is greater than the maximum weight supported by the hardware component to which the FEC hierarchy is to be programmed. As discussed above in the description of FIG. 1, the maximum weight supported by a given hardware component corresponds to the maximum number of entries that may be programmed to the hardware component. In one or more embodiments, if the weights of higher level FEC nodes to lower level FEC nodes or egress ports exceeds the maximum weight, the method proceeds to Step 314. In one or more embodiments, if the weights of higher level FEC nodes to lower level FEC nodes or egress ports does not exceed the maximum weight, then the method ends.

In Step 314, based on a determination in Step 312 that the maximum weight supported by a hardware component has been exceeded, a weight reduction action is performed. In one or more embodiments, a weight reduction action includes reducing the weights of links from one or more higher level FEC nodes to lower level FEC nodes or egress ports such that the total of the weights is equal to or less than the maximum weight supported by the hardware component. In one or more embodiments, such a weight reduction is performed by finding the sum of all of the weights from a given higher level FEC node, dividing the maximum weight by the sum, and multiplying the result by the weight from the higher level FEC node by each weight from the higher level FEC node to lower level FEC nodes or egress ports.

As an example, a given hardware component may have a maximum weight of 100. A higher level FEC node may have a pointer to three lower level FEC nodes, with weights of 20, 40, and 100. The sum of the weights is 160, which is higher than 100. Therefore, the maximum supported weight 100 is divided by 160 to yield a result of 0.625. For the link with a weight of 20, 20 is multiplied by 0.625 to yield 12.5. For the link with a weight of 40, 40 is multiplied by 0.625 to yield 25. For the link with a weight of 100, 100 is multiplied by 0.625 to yield 62.5. As discussed above, weights must be natural numbers. Therefore, 12.5 is rounded down to 12, and 62.5 is rounded down to 62. Thus, the new set of weights is [12, 25, and 62]. The sum of 12, 25, and 62 is 99, which is less than the maximum supported weight of 100.

As another example, a given hardware component may have a maximum weight of 40. A higher level FEC node may have outgoing weights of 16, 17, and 18 after reducing the weights using the GCD as in Step 310. The sum of the weights is 51. Therefore, the maximum supported weight 40 is divided by 51 to yield a result of approximately 0.7843. For the link with a weight of 16, 16 is multiplied by 0.7843 to yield 12.5488. For the link with a weight of 17, 17 is multiplied by 0.7843 to yield 13.3331. For the link with a weight of 18, 18 is multiplied by 0.7843 to yield 14.1174. As discussed above, weights must be natural numbers. Therefore, 12.5488 is rounded down to 12, 13.3331 is rounded down to 13, and 14.1174 is rounded down to 14. Thus, the new set of weights is [12, 13, and 14]. The sum of 12, 13, and 14 is 39, which is less than the maximum supported weight of 40.

In one or more embodiments, after the steps of FIG. 3 are performed, along with any other steps of a FEC hierarchy action set and/or FEC hierarchy flattening action set, the resulting FEC hierarchy is programmed as discussed above in the description of either Steps 208 or 216 of FIG. 2.

FIGS. 4-8 show an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIGS. 4-8, consider a scenario in which a FEC hierarchy provider stores a FEC hierarchy (400) (shown in FIG. 4) implementing UCMP in memory shared with a FEC hierarchy manager that the FEC hierarchy provider desires to be programmed into a hardware component of a network device. The FEC hierarchy manager obtains FEC hierarchy (400) from the shared memory.

In such a scenario, FEC node A of the FEC hierarchy (400) includes pointers to FEC nodes B, C, and D. FEC node B has a weight of two. FEC node C has a weight of four. FEC node D has a weight of six. FEC node B has pointers to FEC nodes E, F, and G. FEC node E has a weight of four. FEC node F has a weight of five. FEC node G has a weight of six. FEC node C has pointers to FEC nodes H and I. FEC node H has a weight of 14, and FEC node I has a weight of 7. FEC node H has pointers to FEC node J and FEC node K. FEC node J has a weight of 8 and FEC node K has a weight of 9. FEC node D has a weight of 6.

To determine the hierarchy height, the FEC hierarchy manager starts with the bottom level nodes D, E, F, G, J, K, and I, each of which point to an egress port. The FEC hierarchy manager determines that the greatest number of levels of indirection are from FEC node J and FEC node K to FEC node A, which represents 3 levels of indirection, making the hierarchy height 3.

Next, the FEC hierarchy manager checks the FEC hierarchy data repository to determine that the hardware component to which FEC hierarchy (400) is to be programmed has an MLI quantity (i.e., a target height) 1. Accordingly, the FEC hierarchy must be flattened to a hierarchy height of 1.

Next, the FEC hierarchy manager checks the sets of weights from each of the FEC nodes that have immediate lower level FEC nodes, which are FEC nodes A, B, C, and H, and determines that FEC nodes A and C each have a set of weights that have a GCD other than 1 For FEC node A the GCD of 2, 4, and 6 is 2. Therefore the set of FEC weights is divided by 2, yielding 1, 2, and 3. For FEC node C, the GCD of 14 and 7 is seven. Therefore, the set of FEC weights is divided by 7, yielding 2 and 1.

As discussed above in the description of Step 310 in FIG. 3, dividing weights by their GCD may be performed either at the beginning of the weight preservation process, as shown in the present example, or later in the process after lower level FEC node weights have been updated using a rebasing factor and before an assessment of whether the total weights exceed the maximum weight of a hardware component.

Figure 5:
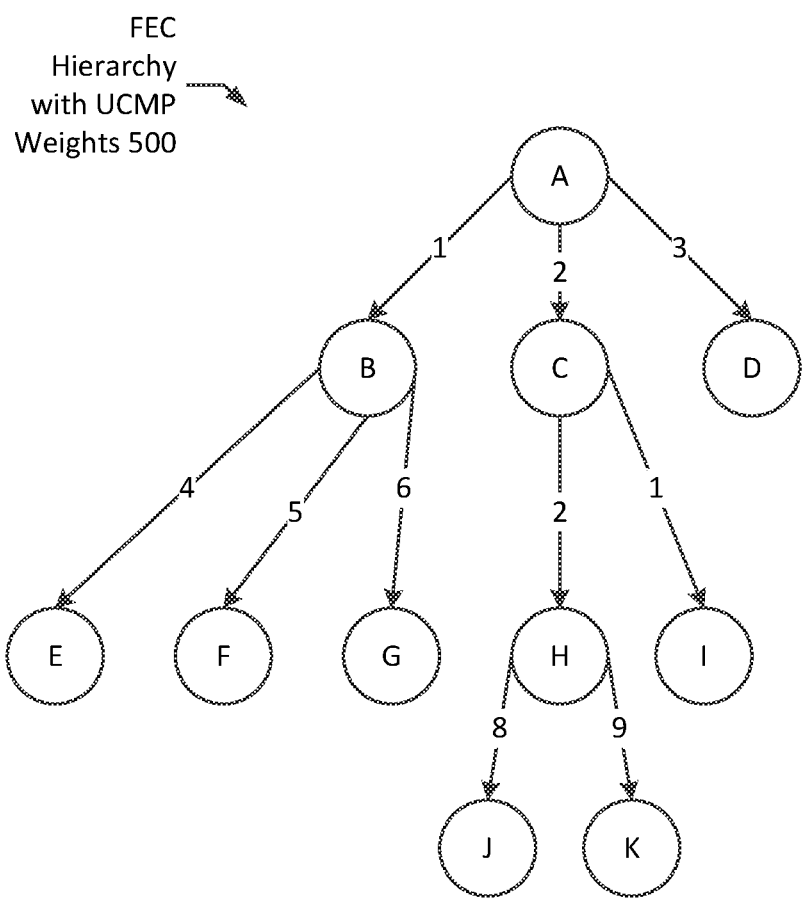

The resulting FEC hierarchy (500) after the GCD calculations is shown in FIG. 5.

Next, to remove a level of indirection from the FEC hierarchy, FEC node H is removed, and replaced with links from FEC node C to FEC nodes J and K in addition to the link to FEC node I.

Next the weights from FEC node C to FEC nodes J, K, and I must be re-calculated. First, the rebasing factor for FEC node C is determined by summing the weight from removed FEC node H to FEC node J (8) and the weight from removed FEC node H to FEC node K (9), and finding the LCM for that sum (17) and the weight from FEC node C to FEC node I (1). The LCM of 17 and 1 is 17, which is the rebasing factor for FEC node C.

Next, to find the new weight from FEC node C to FEC node J, the rebasing factor for FEC node C (17) is divided by the sum of the weights from removed FEC node H to FEC nodes J and K (17), yielding a result of 1. Next, the result 1 is multiplied by the weight from FEC node C to removed FEC node H (2) and the weight from removed FEC node H to FEC node J (8), yielding 16. Next, the result 1 is multiplied by the weight from FEC node C to removed FEC node H (2) and the weight from removed FEC node H to FEC node K (9), yielding 18. Next, because FEC I has no next level FECs, the weight from FEC node C to FEC node I (1) is multiplied by the rebasing factor (17), yielding 17.

Figure 6:
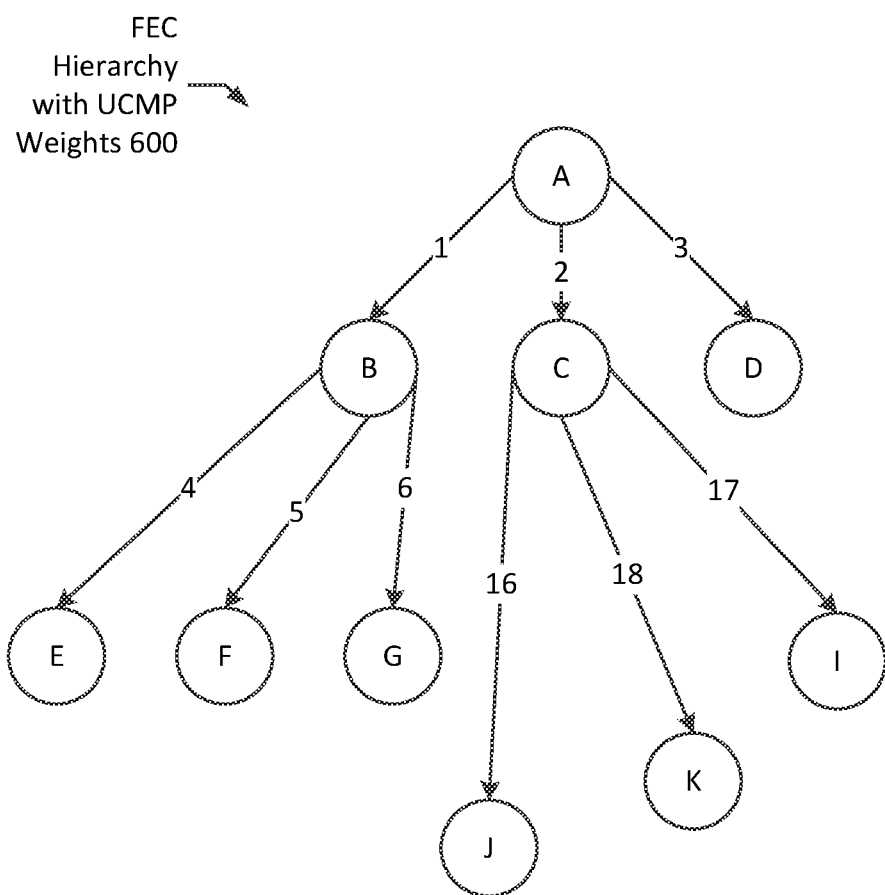

The resulting FEC hierarchy (600) after the removal of FEC node H is shown in FIG. 6.

Next, to remove another level of indirection from the FEC hierarchy, FEC nodes B and C are removed, and replaced with links from FEC node A to FEC nodes E, F, G, J, K, and I, in addition to the link to FEC node D.

Next the weights from FEC node B to FEC nodes E, F, and G must be re-calculated. First, the rebasing factor for FEC node A is determined. The rebasing factor for FEC node A is determined by first summing the weight from removed FEC node B to FEC node E (4), the weight from removed FEC node B to FEC node F (5), and the weight from removed FEC node B to FEC node G (6), yielding 15. Next the sum is determined for the weight from removed FEC node C to FEC node J (16), the weight from removed FEC node C to FEC node K (18), and the weight from removed FEC node C to FEC node I (17), yielding 51. Next, the LCM for the sums (15 and 51), and the weight from FEC node A to FEC node D (3) is determined, yielding 255.

Next, to find the new weight from FEC node A to FEC node E, the rebasing factor for FEC node A (255) is divided by the sum of the weights from removed FEC node B to FEC nodes E, F, and G (15), yielding a result of 17. Next, the result 17 is multiplied by the weight from FEC node A to removed FEC node B (1) and the weight from removed FEC node B to FEC node E (4), yielding 68.

Next, to find the new weight from FEC node A to FEC node F, the rebasing factor for FEC node A (255) is divided by the sum of the weights from removed FEC node B to FEC nodes E, F, and G (15), yielding a result of 17. Next, the result 17 is multiplied by the weight from FEC node A to removed FEC node B (1) and the weight from removed FEC node B to FEC node F (5), yielding 85.

Next, to find the new weight from FEC node A to FEC node G, the rebasing factor for FEC node A (255) is divided by the sum of the weights from removed FEC node B to FEC nodes E, F, and G (15), yielding a result of 17. Next, the result 17 is multiplied by the weight from FEC node A to removed FEC node B (1) and the weight from removed FEC node B to FEC node G (6), yielding 102.

Next, to find the new weight from FEC node A to FEC node J, the rebasing factor for FEC node A (255) is divided by the sum of the weights from removed FEC node C to FEC nodes J, K, and I (51), yielding a result of 5. Next, the result 5 is multiplied by the weight from FEC node A to removed FEC node C (2) and the weight from removed FEC node C to FEC node J (16), yielding 160.

Next, to find the new weight from FEC node A to FEC node K, the rebasing factor for FEC node A (255) is divided by the sum of the weights from removed FEC node C to FEC nodes J, K, and I (51), yielding a result of 5. Next, the result 5 is multiplied by the weight from FEC node A to removed FEC node C (2) and the weight from removed FEC node C to FEC node K (18), yielding 180.

Next, to find the new weight from FEC node A to FEC node I, the rebasing factor for FEC node A (255) is divided by the sum of the weights from removed FEC node C to FEC nodes J, K, and I (51), yielding a result of 5. Next, the result 5 is multiplied by the weight from FEC node A to removed FEC node C (2) and the weight from removed FEC node C to FEC node I (17), yielding 170.

Next, because FEC D has no next level FECs, the weight from FEC node A to FEC node D (3) is multiplied by the rebasing factor (255), yielding 765.

Figure 7:
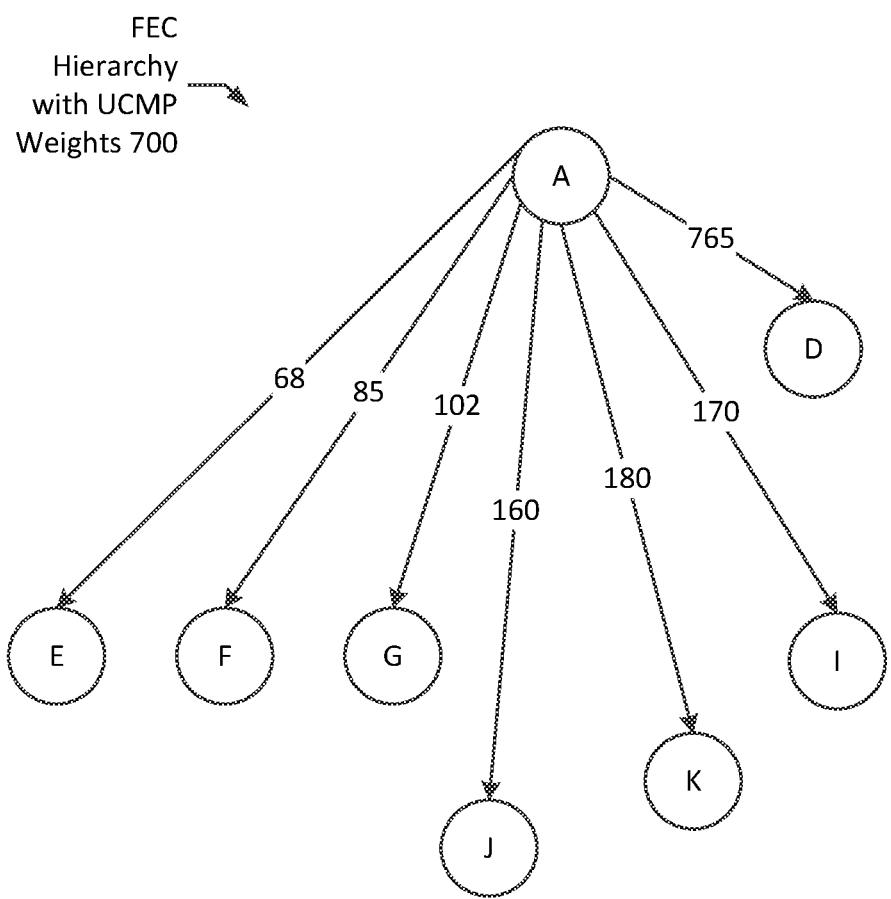

Now that two levels of indirection have been removed while preserving the relative weights of the FEC hierarchy, the resulting FEC hierarchy has a hierarchy height of one, and is shown as FEC hierarchy (700) in FIG. 7.

Next, the sum of the weights of FEC hierarchy (700), which is 1530, is checked against a maximum weight of the hardware component to which the FEC hierarchy is to be programmed, which is 100. Because the maximum weight is exceeded, the weight must be reduced. Weight reduction is achieved by first dividing the maximum weight (100) by the total weight of FEC hierarchy (700) (1530), yielding approximately 0.06536. Each link from FEC node A is then multiplied by the result, and rounded down if not a natural number. The results are as follows: the link from FEC node A to FEC node E is reduced to 4 (68 multiplied by 0.06536 and rounded down to a natural number); the link from FEC node A to FEC node F is reduced to 5 (85 multiplied by 0.06536 and rounded down to a natural number); the link from FEC node A to FEC node G is reduced to 6 (102 multiplied by 0.06536 and rounded down to a natural number); the link from FEC node A to FEC node J is reduced to 10 (160 multiplied by 0.06536 and rounded down to a natural number); the link from FEC node A to FEC node K is reduced to 11 (180 multiplied by 0.06536 and rounded down to a natural number); the link from FEC node A to FEC node K is reduced to 11 (170 multiplied by 0.06536 and rounded down to a natural number); and the link from FEC node A to FEC node D is reduced to 50 (765 multiplied by 0.06536 and rounded down to a natural number). The sum of the new weights is 97, which is less than the maximum weight for the hardware component, meaning the new FEC hierarchy may be programmed to the hardware component.

Figure 8:
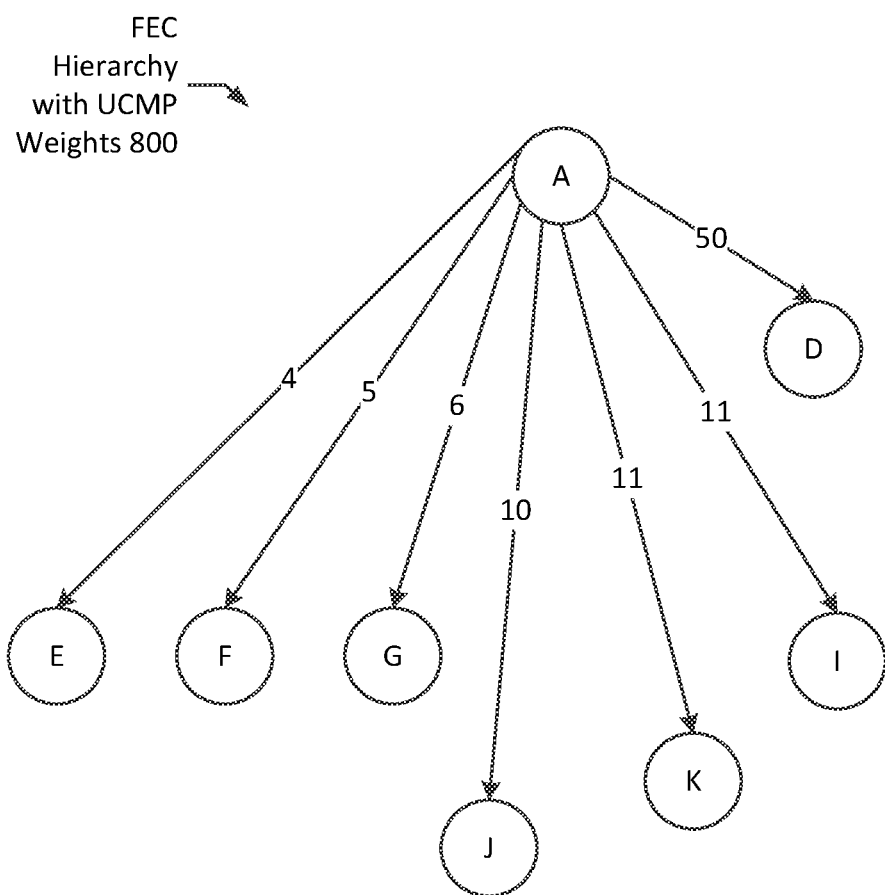

Now that two levels of indirection have been removed while preserving the relative weights of the FEC hierarchy, and the weight of the FEC hierarchy has been reduced to below the maximum weight supported by the hardware component, the resulting FEC hierarchy has a hierarchy height of one, and is shown as FEC hierarchy (800) in FIG. 8. The new FEC hierarchy is then programmed to the hardware component.

Figure 9:
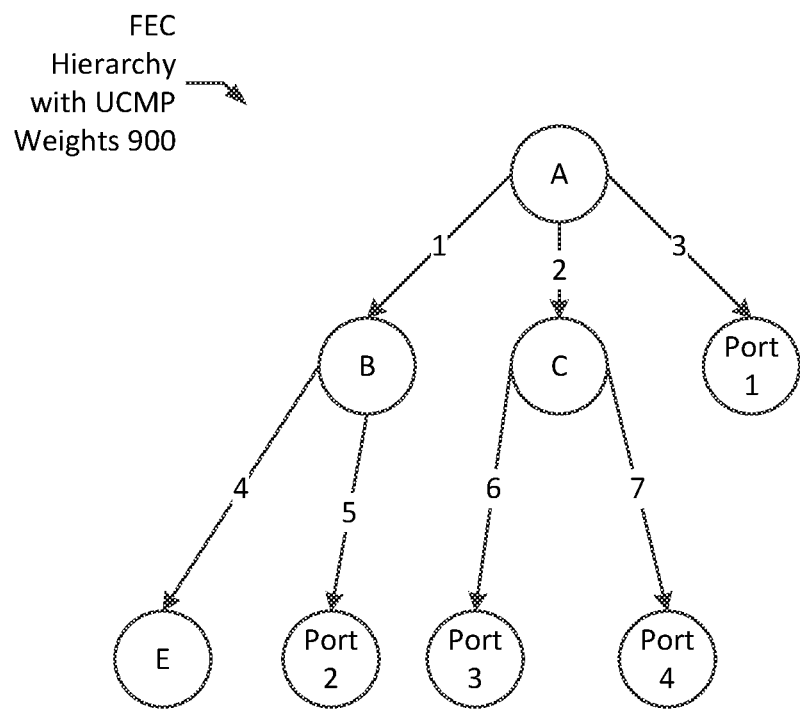
FIGS. 9-11 show an example in accordance with one or more embodiments described herein.
Figure 10:
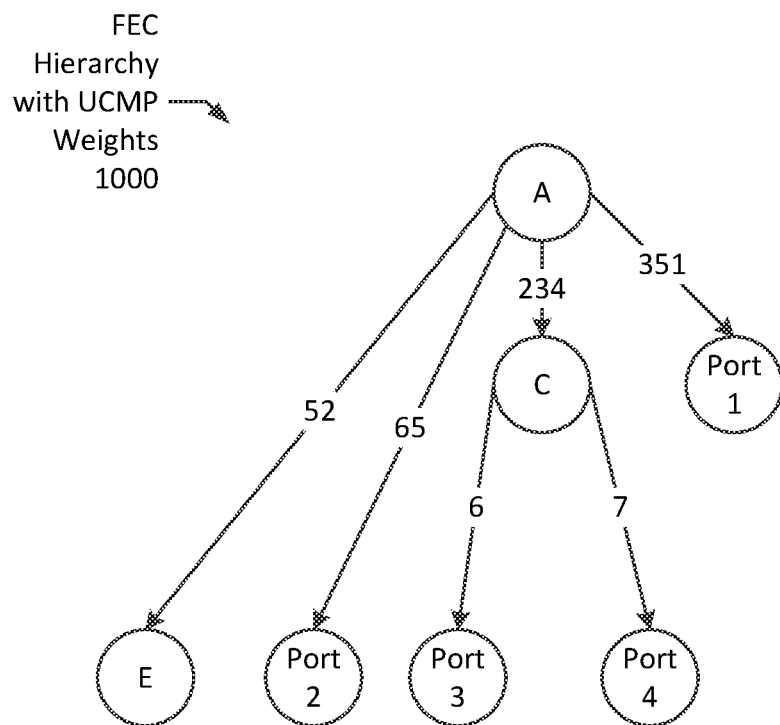
Figure 11:
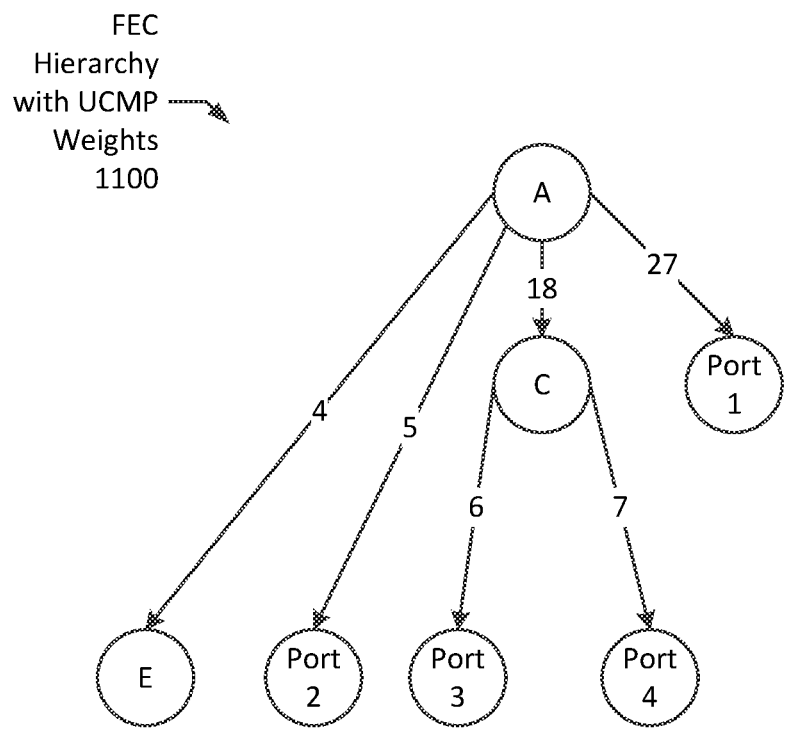

FIGS. 9-11 show an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIGS. 9-11, consider a scenario in which a FEC hierarchy provider stores a FEC hierarchy (900) (shown in FIG. 9) implementing UCMP in memory shared with a FEC hierarchy manager that the FEC hierarchy provider desires to be programmed into a hardware component of a network device. The FEC hierarchy manager obtains FEC hierarchy (900) from the shared memory.

In such a scenario, FEC node A of the FEC hierarchy (900) includes pointers to FEC nodes B, C, and Port 1, which is an egress port. FEC node B has a weight of 1. FEC node C has a weight of 2. FEC node D has a weight of 3. FEC node B has pointers to FEC nodes E and Port 2, which is another egress port. FEC node E has a weight of four. Port 2 has a weight of 5. FEC node C is a leaf node, and has a pointers to Port 3 and Port 4. Port 3 has a weight of 6. Port 4 has a weight of 7.

The FEC hierarchy manager determines that the greatest number of levels of indirection is from FEC node E to FEC node A, which represents 2 levels of indirection, making the hierarchy height 2.

Next, the FEC hierarchy manager checks the FEC hierarchy data repository to determine that the hardware component to which FEC hierarchy (400) is to be programmed has an MLI quantity (i.e., a target height) of 1. Accordingly, the FEC hierarchy (900) must be flattened to a hierarchy height of 1. To do so, FEC node B must be removed from the FEC hierarchy.

The rebasing factor for FEC node A is the LCM of the sum of the outgoing weights of FEC node B (i.e., 4+5=9), the sum of the outgoing weights from FEC C (i.e., 6+7=13), and the weight outgoing from Port 1 (i.e., 1). The LCM of 9, 13, and 1 is 117, which is the rebasing factor for FEC node A.

Next, the weights are updated as the FEC is flattened by dividing the rebasing factor 117 by the sum of the outgoing weights of FEC node B (i.e., 9). 117 divided by 9 is 13. Then 13 is multiplied by the weight from FEC node A to FEC node B (i.e., 1) and the weight from FEC node B to FEC node E (i.e., 4), yielding an updated weight from FEC node A to FEC node E of 52. Then 13 is multiplied by the weight from FEC node A to FEC node B (i.e., 1) and the weight from FEC node B to Port 2 (i.e., 5), yielding an updated weight from FEC node A to port 2 of 65.

Next, because FEC node C has no layers of indirection to any next level FEC nodes, the weight from FEC node A to FEC node C (2) is multiplied by the rebasing factor 117, yielding a new weight of 234. Similarly, the weight from FEC node A to Port 1 (i.e., 3) is multiplied by the rebasing factor 117, yielding 351.

The FEC hierarchy after the above-described actions is shown as FEC hierarchy (1000) in FIG. 10.

Next, a GCD for the outgoing weights from FEC A is determined. The GCD of 52, 65, 234, and 351 is 13. Thus, each of the weights from FEC node A are divided by the GCD 13. After the division, the updated weight from FEC node A to FEC node E (i.e., 52) is 4, the updated weight from FEC node A to Port 1 (i.e., 65) is 5, the updated weight from FEC node A to FEC node C (i.e., 234) is 18, and the updated weight from FEC node A to port 1 (i.e., 351) is 27.

Next, the FEC hierarchy manager determines that, after performing the above-described actions, the maximum weight supported by the hardware component to which the FEC hierarchy is to be programmed is not exceeded by the weights remaining in the flattened FEC hierarchy, so no weight reduction action is needed.

The FEC hierarchy after the above-described actions is shown as FEC hierarchy (1100) in FIG. 11.

While embodiments described herein have been described with respect to a limited number of embodiments, those skilled in the art, having benefit of this disclosure, will appreciate that other embodiments can be devised which do not depart from the scope of embodiments as disclosed herein. Accordingly, the scope embodiments described herein should be limited only by the attached claims.

What is claimed is:

1. A method for preserving forwarding equivalence class (FEC) hierarchy weights, the method comprising:
   obtaining a FEC hierarchy;
   obtaining a target height for the FEC hierarchy;
   identifying within the FEC hierarchy a FEC node comprising pointers to a plurality of lower level FEC nodes;
   making a first determination that a height of the FEC node is greater than the target height;
   obtaining, based on the first determination, a rebasing factor for the FEC node;
   updating weights for the plurality of lower level FEC nodes using the rebasing factor to obtain an updated FEC hierarchy;
   obtaining a greatest common divisor (GCD) of the updated weights of the plurality of lower level FEC nodes of the updated FEC hierarchy;
   dividing the updated weights by the GCD to obtain reduced quantity weights for the plurality of lower level FEC nodes; and
   programming the reduced quantity weights as a portion of the updated FEC hierarchy in a hardware component of a network device.

2. The method of claim 1, wherein updating the weights for the plurality of lower level FEC nodes comprises:
   performing, based on the first determination, an identification of a lower level FEC node of the plurality of lower level FEC nodes comprising pointers to a plurality of next level nodes;
   based on the identification, removing the lower level FEC node from the FEC hierarchy; and
   replacing the removed lower level FEC node with pointers from the FEC node to the plurality of next level nodes.

3. The method of claim 2, wherein replacing the removed lower level FEC node with pointers from the FEC node to the plurality of next level nodes comprises:
   multiplying each of the weights for the plurality of lower level FEC nodes by each other and by a quantity representing the rebasing factor divided by a sum of the weights.

4. The method of claim 2, wherein updating the weights for the plurality of lower level FEC nodes occurs as a part of a FEC hierarchy flattening action set performed on the FEC hierarchy to obtain the updated FEC hierarchy.

5. The method of claim 4, further comprising, after performing the FEC hierarchy flattening action set:
   making a second determination that a hierarchy height of the updated FEC hierarchy is equal to or less than the target height; and
   based on the second determination, programming the updated FEC hierarchy to the hardware component.

6. The method of claim 1, wherein updating the weights for the plurality of lower level FEC nodes comprises:
   performing, based on the first determination, an identification of a lower level FEC node of the plurality of lower level FEC nodes;
   obtaining a lower level FEC node weight of the lower level FEC node; and
   multiplying the lower level FEC node weight by the rebasing factor.

7. The method of claim 1, further comprising:
   obtaining a maximum weight for the hardware component;
   making a second determination that a sum of the reduced quantity weights exceeds the maximum weight; and
   based on the second determination, performing a weight reduction action for each of the reduced quantity weights of the plurality of lower level FEC nodes of the updated FEC hierarchy.

8. The method of claim 1, further comprising:
   obtaining a second FEC hierarchy;
   obtaining a second target height for the second FEC hierarchy;
   identifying within the second FEC hierarchy a second FEC node comprising pointers to a second plurality of lower level FEC nodes;
   making a second determination that a height of the FEC node is equal to or less than the second target height;
   obtaining a second greatest common divisor (GCD) of weights of the second plurality of lower level FEC nodes;
   dividing the weights by the second GCD to obtain reduced quantity weights for the second plurality of lower level FEC nodes to obtain a second updated FEC hierarchy; and
   programming the second updated FEC hierarchy to the hardware component.

9. The method of claim 1, wherein obtaining the rebasing factor comprises obtaining a lowest common multiple (LCM) of the weights for the plurality of lower level FEC nodes.

10. A non-transitory computer readable medium comprising instructions that, when executed by a processor, perform a method for preserving forwarding equivalence class (FEC) hierarchy weights, the method comprising:
    obtaining a FEC hierarchy;
    obtaining a target height for the FEC hierarchy;
    identifying within the FEC hierarchy a FEC node comprising pointers to a plurality of lower level FEC nodes;

making a first determination that a height of the FEC node is greater than the target height;

obtaining, based on the first determination, a rebasing factor for the FEC node;

updating weights for the plurality of lower level FEC nodes using the rebasing factor to obtain an updated FEC hierarchy;

obtaining a greatest common divisor (GCD) of the updated weights of the plurality of lower level FEC nodes of the updated FEC hierarchy;

dividing the updated weights by the GCD to obtain reduced quantity weights for the plurality of lower level FEC nodes; and programming the reduced quantity weights as a portion of the updated FEC hierarchy in a hardware component of a network device.

11. The non-transitory computer readable medium of claim 10, wherein updating the weights for the plurality of lower level FEC nodes comprises:

performing, based on the first determination, an identification of a lower level FEC node of the plurality of lower level FEC nodes comprising pointers to a plurality of next level nodes;

based on the identification, removing the lower level FEC node from the FEC hierarchy; and replacing the removed lower level FEC node with pointers from the FEC node to the plurality of next level nodes.

12. The non-transitory computer readable medium of claim 11, wherein replacing the removed FEC lower level node with pointers from the FEC node to the plurality of next level nodes comprises:

multiplying each of the weights for the plurality of lower level FEC nodes by each other and by a quantity representing the rebasing factor divided by a sum of the weights.

13. The non-transitory computer readable medium of claim 11, wherein updating the weights for the plurality of lower level FEC nodes occurs as a part of a FEC hierarchy flattening action set performed on the FEC hierarchy to obtain the updated FEC hierarchy.

14. The non-transitory computer readable medium of claim 13, further comprising, after performing the FEC hierarchy flattening action set:

making a second determination that a hierarchy height of the updated FEC hierarchy is equal to or less than the target height; and based on the second determination, programming the updated FEC hierarchy to the hardware component.

15. The non-transitory computer readable medium of claim 10, wherein updating the weights for the plurality of lower level FEC nodes comprises:

performing, based on the first determination, an identification of a lower level FEC node of the plurality of lower level FEC nodes;

obtaining a lower level FEC node weight of the lower level FEC node; and multiplying the lower level FEC node weight by the rebasing factor.

16. The non-transitory computer readable medium of claim 10, wherein the method performed by executing the instructions further comprises:

obtaining a maximum weight for the hardware component;

making a second determination that a sum of the reduced quantity weights exceeds the maximum weight; and based on the second determination, performing a weight reduction action for each of the reduced quantity weights of the plurality of lower level FEC nodes of the updated FEC hierarchy.

17. The non-transitory computer readable medium of claim 10, wherein the method performed by executing the instructions further comprises, further comprising:

obtaining a second FEC hierarchy;

obtaining a second target height for the second FEC hierarchy;

identifying within the second FEC hierarchy a second FEC node comprising pointers to a second plurality of lower level FEC nodes;

making a second determination that a height of the FEC node is equal to or less than the second target height;

obtaining a second greatest common divisor (GCD) of weights of the second plurality of lower level FEC nodes;

dividing the weights by the second GCD to obtain reduced quantity weights for the second plurality of lower level FEC nodes to obtain a second updated FEC hierarchy; and programming the second updated FEC hierarchy to the hardware component.

18. The non-transitory computer readable medium of claim 10, wherein obtaining the rebasing factor comprises obtaining a lowest common multiple (LCM) of the weights for the plurality of lower level FEC nodes.

* * * * *